: US 8,665,788 B1
(45) Date of Patent: Mar. 4, 2014

(54) PHY DEVICE PREAMBLE FORMATTING SUWS, INVERSE SUWS, SYNC, AND TONE

(75) Inventors: Tomas Motos, Oslo (NO); Robin Hoel, Oslo (NO)

(73) Assignee: Texas Instruments Incorporated, Dallas, TX (US)

( * ) Notice: Subject to any disclaimer, the term of this patent is extended or adjusted under 35 U.S.C. 154(b) by 385 days.

(21) Appl. No.: 13/078,920

(22) Filed: Apr. 1, 2011

(51) Int. Cl.
*H04W 4/00* (2009.01)

(52) U.S. Cl.
USPC .................. 370/328; 370/338; 370/350

(58) Field of Classification Search
None
See application file for complete search history.

(56) References Cited

U.S. PATENT DOCUMENTS

| | | | |
|---|---|---|---|
| 6,760,347 B1 * | 7/2004 | Ojard et al. ................. 370/516 |
| 2004/0053624 A1 * | 3/2004 | Frank et al. ................ 455/453 |
| 2004/0054820 A1 * | 3/2004 | Karaoguz et al. ............... 710/8 |
| 2004/0062273 A1 * | 4/2004 | Frank et al. .................. 370/468 |
| 2004/0081140 A1 * | 4/2004 | Martin ........................ 370/352 |
| 2004/0081144 A1 * | 4/2004 | Martin et al. ................ 370/360 |
| 2004/0114546 A1 * | 6/2004 | Seshadri et al. ........... 370/310.2 |
| 2006/0045083 A1 * | 3/2006 | Hasty et al. ................. 370/389 |
| 2007/0064738 A1 * | 3/2007 | Takagi et al. ............... 370/473 |
| 2009/0245241 A1 * | 10/2009 | Martin ........................ 370/360 |
| 2011/0026487 A1 * | 2/2011 | Karaoguz et al. ............. 370/331 |
| 2011/0134866 A1 * | 6/2011 | Frank et al. .................. 370/329 |

* cited by examiner

*Primary Examiner* — Bob Phunkulh
(74) *Attorney, Agent, or Firm* — Lawrence J. Bassuk; Wade J. Brady, III; Frederick J. Telecky, Jr.

(57) ABSTRACT

A preamble sequence according to the disclosed systems and methods of setting a preamble sequence for multilevel frequency modulations is comprised of four sections: an initiation sequence, based on a repeatable unique word; a start of frame delimiter, which consists of the negation of the unique word; a continuous wave signal with a certain duration and frequency added after the start of frame delimiter; and an additional sequence for further training of the receiver, also based on repetitions of the unique word and/or its negations.

4 Claims, 3 Drawing Sheets

PHY DEVICE PREAMBLE FORMATTING SUWS, INVERSE SUWS, SYNC, AND TONE

TECHNICAL FIELD

The present disclosure is generally related to telecommunications and, more particularly, is related to wireless networking.

BACKGROUND

Communication networks come in a variety of forms. Notable networks include wireline and wireless. Wireline networks include local area networks (LANs), DSL networks, and cable networks, among others. Wireless networks include cellular telephone networks, classic land mobile radio networks and satellite transmission networks, among others. These wireless networks are typically characterized as wide area networks. More recently, wireless local area networks and wireless home networks have been proposed, and standards, such as Bluetooth and IEEE 802.11, have been introduced to govern the development of wireless equipment for such localized networks.

A wireless local area network (LAN) typically uses infrared (IR) or radio frequency (RF) communications channels to communicate between portable or mobile computer terminals and stationary access points or base stations. These access points are, in turn, connected by a wired or wireless communications channel to a network infrastructure which connects groups of access points together to form the LAN, including, optionally, one or more host computer systems.

Wireless protocols such as Bluetooth and IEEE 802.11 support the logical interconnections of such portable roaming terminals having a variety of types of communication capabilities to host computers. The logical interconnections are based upon an infrastructure in which at least some of the terminals are capable of communicating with at least two of the access points when located within a predetermined range, each terminal being normally associated, and in communication, with a single one of the access points. Based on the overall spatial layout, response time, and loading requirements of the network, different networking schemes and communication protocols have been designed so as to most efficiently regulate the communications.

IEEE Standard 802.11 ("802.11") is set out in "Wireless LAN Medium Access Control (MAC) and Physical Layer (PHY) Specifications" and is available from the IEEE Standards Department, Piscataway, N.J. 802.11 permits either IR or RF communications at 1 Mbps, 2 Mbps and higher data rates, a medium access technique similar to carrier sense multiple access/collision avoidance (CSMA/CA), a power-save mode for battery-operated mobile stations, seamless roaming in a full cellular network, high throughput operation, diverse antenna systems designed to eliminate "dead spots," and an easy interface to existing network infrastructures.

Demand for higher data rates may result in the need for devices that can communicate with each other at the higher rates, yet co-exist in the same WLAN environment or area without significant interference or interruption from each other, regardless of whether the higher data rate devices can communicate with legacy devices. It may further be desired that high data rate devices be able to communicate with the legacy devices, such as at any of the standard legacy rates.

Increasing the data rate and allowing more effective use of bandwidth for devices operating in these bands enables more efficient communications. A higher data rate may enable service providers to more effectively use their allotted spectrum. Consumers may realize a cost savings as well. There are heretofore unaddressed needs with previous solutions.

SUMMARY

Example embodiments of the present disclosure provide systems of setting a preamble sequence for multilevel frequency modulations. Briefly described, in architecture, one example embodiment of the physical layer device, among others, can be implemented as follows: an encoder configured to format a preamble of a data packet, the preamble comprising: an initial sequence; a synchronization mark; a tone signal following the synchronization mark; and an additional sequence.

Embodiments of the present disclosure can also be viewed as providing a computer readable medium comprising a computer program comprising instructions for setting a preamble sequence for multilevel frequency modulations. In this regard, one embodiment of such instructions, among others, can be broadly summarized by the following: encoding a preamble of a data packet, the preamble comprising: an initial sequence; a synchronization mark; a tone signal following the synchronization mark; and an additional sequence.

DETAILED DESCRIPTION

Embodiments of the present disclosure will be described more fully hereinafter with reference to the accompanying drawings in which like numerals represent like elements throughout the several figures, and in which example embodiments are shown. Embodiments of the claims may, however, be embodied in many different forms and should not be construed as limited to the embodiments set forth herein. The examples set forth herein are non-limiting examples and are merely examples among other possible examples.

Figure 1:
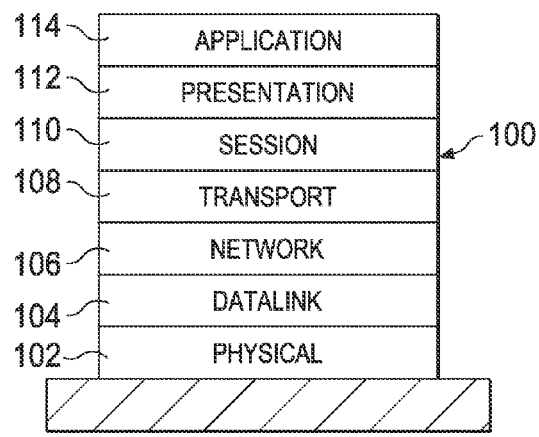
FIG. 1 is a block diagram of an example embodiment of an International Organization for Standards (ISO) Basic Reference Model of open systems interconnection (OSI).

The IEEE802.11 standard is directed to wireless LANs, and in particular specifies the MAC and the PHY layers. These layers are intended to correspond closely to the two lowest layers of a system based on the ISO Basic Reference Model of OSI, i.e., the data link layer and the physical layer. FIG. 1 shows a diagrammatic representation of an open systems interconnection (OSI) layered model 100 developed by the International Organization for Standards (ISO) for describing the exchange of information between layers in communication networks. The OSI layered model 100 is particularly useful for separating the technological functions of each layer, and thereby facilitating the modification or update of a given layer without detrimentally impacting on the functions of neighboring layers.

At a lower most layer, the OSI model 100 has a physical layer or PHY layer 102 that is responsible for encoding and decoding data into signals that are transmitted across a particular medium. Above the PHY layer 102, a data link layer 104 is defined for providing reliable transmission of data over a network while performing appropriate interfacing with the PHY layer 102 and a network layer 106. The network layer 106 is responsible for routing data between nodes in a network, and for initiating, maintaining and terminating a communication link between users connected to the nodes. A transport layer 108 is responsible for performing data transfers within a particular level of service quality. A session layer 110 is generally concerned with controlling when users are able to transmit and receive data. A presentation layer 112 is responsible for translating, converting, compressing and decompressing data being transmitted across a medium. Finally, an application layer 114 provides users with suitable interfaces for accessing and connecting to a network.

Exemplary embodiments of the encoding techniques for a preamble sequence for multilevel frequency modulations can be processed in a PHY signal processor. A PHY signal processor is configured to perform functionality of the preferred embodiments. A digital communication system may comprise such a processor, alone, or in combination with other logic or components. A system of communications may further be embodied in a wireless radio, or other communication device. Such a communication device may include many wireless communication devices, including computers (desktop, portable, laptop, etc.), consumer electronic devices (e.g., multi-media players), compatible telecommunication devices, personal digital assistants (PDAs), or any other type of network devices, such as printers, fax machines, scanners, hubs, switches, routers, set-top boxes, televisions with communication capability, etc.

Figure 2:
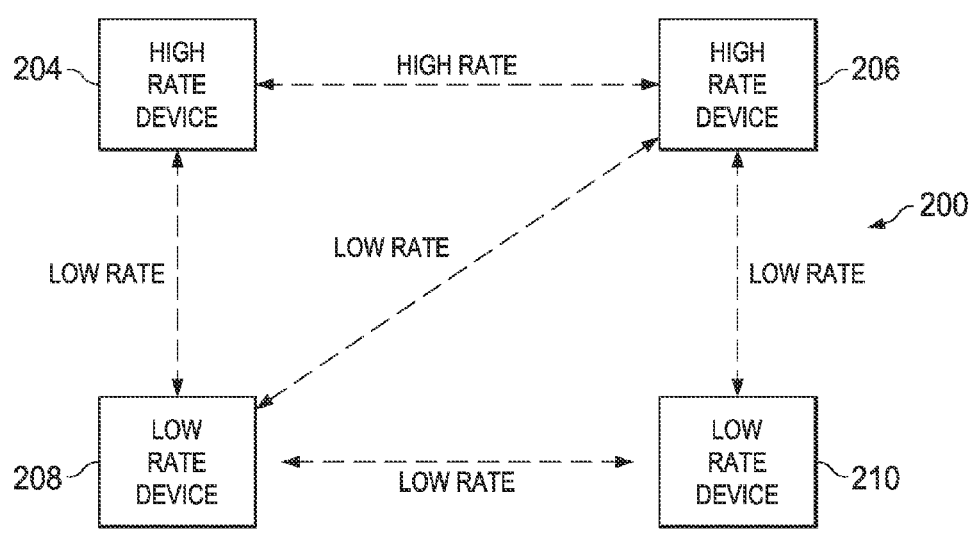
FIG. 2 is a block diagram of an example embodiment of a local area network with devices communicating at different data rates.

FIG. 2 is a block diagram of an example wireless local area network (WLAN) system 200 operating within area 202, including four WLAN devices 204, 206, 208 and 210. Devices 204 and 206 are implemented according to at least one of several embodiments compliant with the 802.11n standard, whereas devices 208 and 210 are implemented according to the 802.11a standard. All of the devices 204-210 operate in the 5 GHz band. The devices 204-210 may include any type of wireless communication device, such as a computer (desktop, portable, laptop, etc.), a television set, infrared devices, a set-top box, a cellular phone, a portable phone, a radio, compatible telecommunication devices, a personal digital assistant (PDA), or other network device, such as printers, facsimile machines, scanners, hubs, switches, routers, etc., or other consumer electronics device. Although described in the context of a communications environment compliant with one or more of the 802.11n standard, the 802.11a standard, the 802.11b standard or the 5 GHz frequency band, other standards and frequencies may be utilized in some embodiments.

Devices 208 and 210 communicate with each other at any of the standard 802.11a rates. The devices 204 and 206 communicate with each other at different data rates than devices 208 and 210. In one or more embodiments, devices 204-210 may operate or coexist in the area 202 without significant interference from each other, where the devices 204, 206 communicate with each other at different data rates than the 802.11a devices 208, 210. In one embodiment, devices 204, 206 can communicate with either or both of devices 208, 210 at any one or more of the standard 802.11a data rates. In one embodiment, devices 204, 206 communicate at different data rates than devices 208 and 210 and are incompatible with the devices 208 and 210, so that the devices 204-210 are not able to coexist within the same area 202. Devices 204, 206 may be implemented to operate in the 5 GHz band, although other frequency bands are contemplated.

Figure 3:
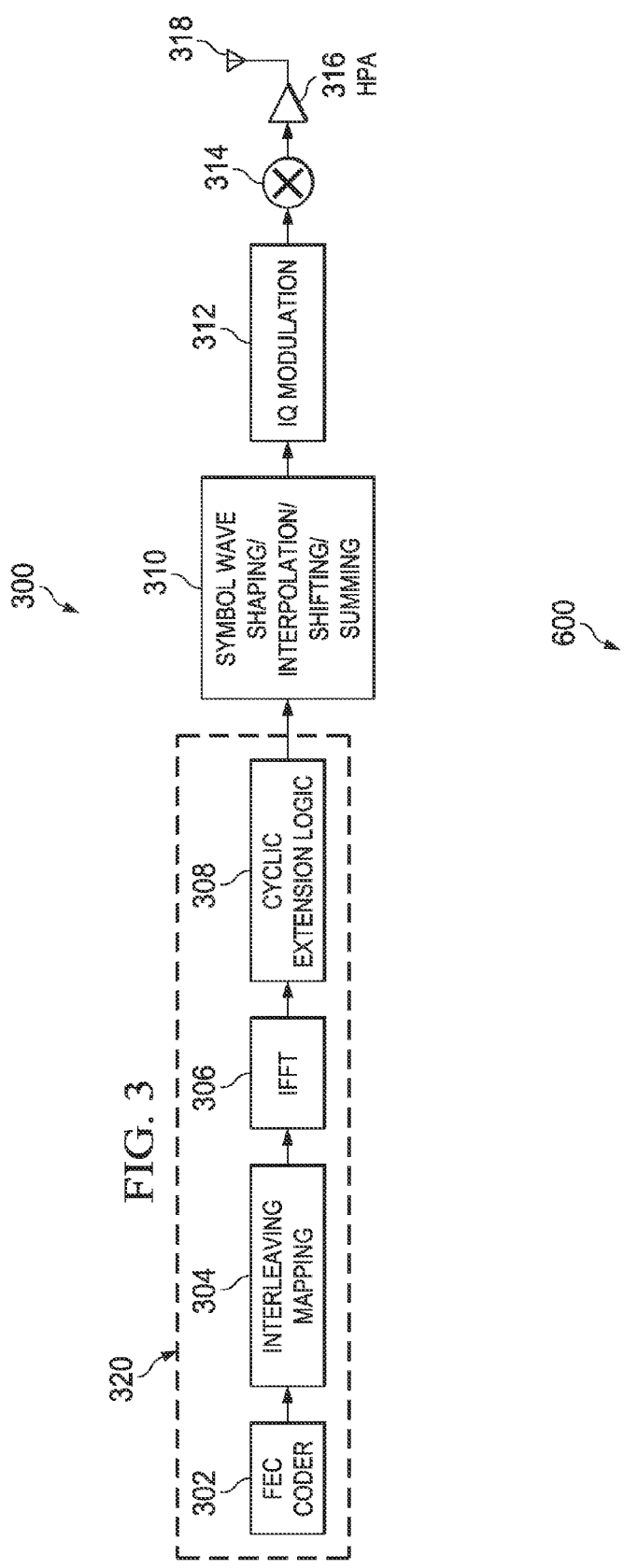
FIG. 3 is a block diagram of an example embodiment of a transmitter of a communications device in the local area network of FIG. 2.

One embodiment of a transmitter for an 802.11 device is provided in FIG. 3. Referring to FIG. 3, a PHY unit 300 includes an orthogonal frequency division multiplex (OFDM) transmit kernel 320, a symbol wave shaper/interpolator/shifter/summer (accumulator, assimilator) 310, an IQ modulator 312, a mixer 314, high power amplifier (HPA) 316, and antenna 318. OFDM transmit kernel 320 includes an FEC coder 302 (for encoding the data received from a MAC unit), an interleaver/mapper 304, an inverse fast Fourier transform (IFFT) unit 306, and cyclic extension logic 308.

During a data transmit process, data and control information are received at the FEC coder 302. The FEC coder 302 encodes data in a forward error correction code. Any forward error correction (FEC) code can be used for this purpose. FEC code examples include a Reed-Solomon and a combination Reed-Solomon and convolution code, among others. The interleaver/mapper 304 subsequently interleaves (reorders, distributes) the encoded data. The output of the interleaver/mapper 304 is sent to the IFFT unit 306. The IFFT unit 306 receives input from the interleaver/mapper 304 and provides OFDM symbols to the cyclic extension logic 308. The cyclic extension logic 308 inserts a cyclic prefix (e.g., guard interval) to ensure that the transmitted symbol retains its orthogonal properties in the presence of multi-path delay spread. The output of the cyclic extension logic 308 is sent to the symbol wave shaper/interpolator/shifter/summer 310. Symbol wave shaper/interpolator/shifter/summer 310 comprises a low-pass filter to smooth the spectral edges between successive OFDM symbols. The trailing edge and leading edge of each OFDM symbol is tapered to prevent spectral splattering outside the frequency channel, minimizing adjacent interference and satisfying regulatory concerns. The symbol wave shaper/interpolator/shifter/summer 310 also comprises interpolation, shifting, and summing functionality as described below.

The output of symbol wave shaper/interpolator/shifter/summer 310 is sent to modulator 312. The modulator 312 modulates the encoded data onto carriers in OFDM symbols in accordance with conventional OFDM modulation techniques. The modulation techniques may be coherent or differential. The modulation mode or type may be Binary Phase Shift Keying and Quadrature Phase Shift Keying, among others.

The output of the modulator 312 is sent to mixer 314 where it is upconverted to the desired transmit frequency. The upconversion may be performed in multiple mixer stages. From mixer 314, the upconverted signal is amplified in high powered amplifier (HPA) 316 and sent to antenna 318 for transmission.

All 802.11 frames are composed of a preamble, a PLCP Header, MAC data and CRC components. The preamble is PHY dependent and includes a synch component and a start frame delimiter. A start frame delimiter may be comprised of a 16-bit binary pattern, such as 0000 1100 1011 1101, which is used to define the frame timing. The synch component is an 80-bit sequence of alternating zeroes and ones, which is used by the PHY circuitry to select an antenna, and to reach steady-state frequency offset correction and synchronization with the received packet timing.

In multilevel frequency modulations (M-ary CPFSK) the transmitted symbols belong to an alphabet of M possible symbols. These symbols are normally symmetrical around 0 and equidistant between consecutive symbols, to improve detection probabilities. For instance for M=8, the symbol alphabet is {−7, −5, −3, −1, +1, +3, +5, +7}. In multilevel FSK, the amount of information bits that are mappable into each symbol is given as log 2(M).

In order to produce a frequency modulated signal, the current symbol belonging to the symbol alphabet is multiplied with the normalized frequency deviation (Fdev). In a M-ary CPFSK format, there are thus M valid outputs of the frequency modulator. The outputs of this frequency modulator are then combined with the outputs of the local oscillator (the local oscillator provides the carrier RF frequency). In M-ary CPSK the output of the frequency modulator is able to slightly modify the frequency of the carrier RF frequency to M different frequencies. A demodulator observing the signal is able to discern those M different frequencies from each other and thus decode directly several bits for each symbol period. In contrast, when M=2, the normal 2-ary FSK, there are only two frequency deviations that carry information, thus an observer can only discern 1 bit per symbol period.

Establishing a radio communication link between digital devices using M-ary CPFSK (M=4, 8, 16, . . . ) uses a precise estimation of the receiver characteristics for every packet that is received. In particular, the receiver should be able to determine any DC offset that is present in the signal band of the receiver, any frequency offset (difference of transmitted carrier frequency and receiver's local frequency), the timing deviation of the transmitted symbols with respect with the nominal, expected timing, the modulation levels used by the transmitted symbols, if that information is a priori unknown to the receiver, and the precise instant for the start of the packet information. The preamble sequence introduce in this invention allows a precise calibration of all of the factors listed above.

Figure 4:
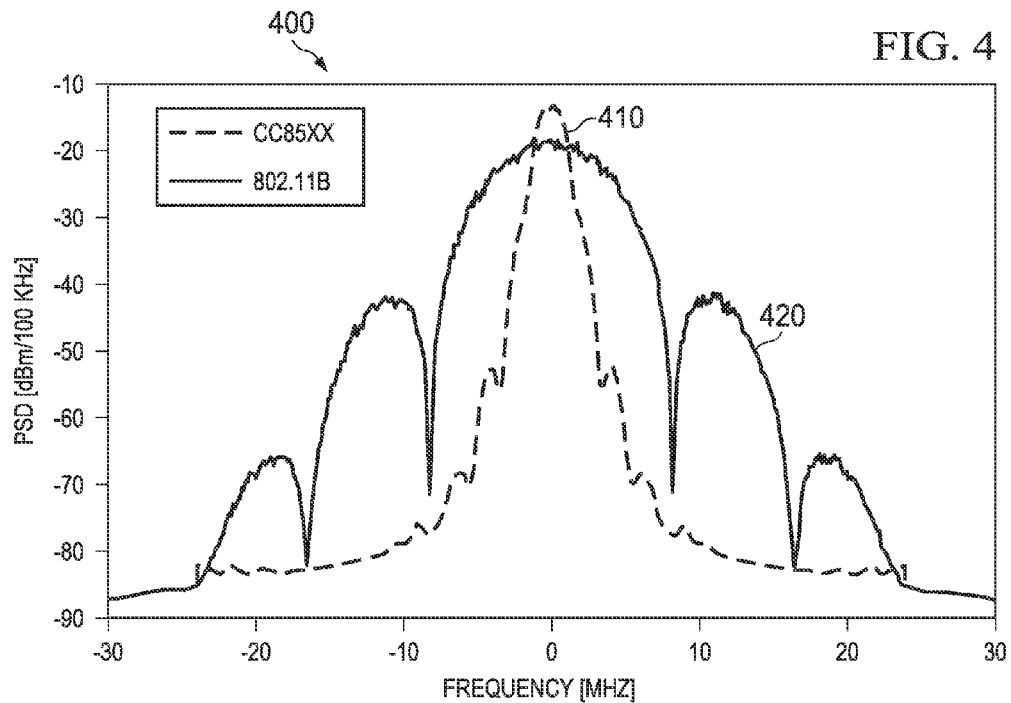
FIG. 4 is a signal diagram of an example embodiment of comparative spectrum characteristics of M-ary CPFSK.
Figure 5:
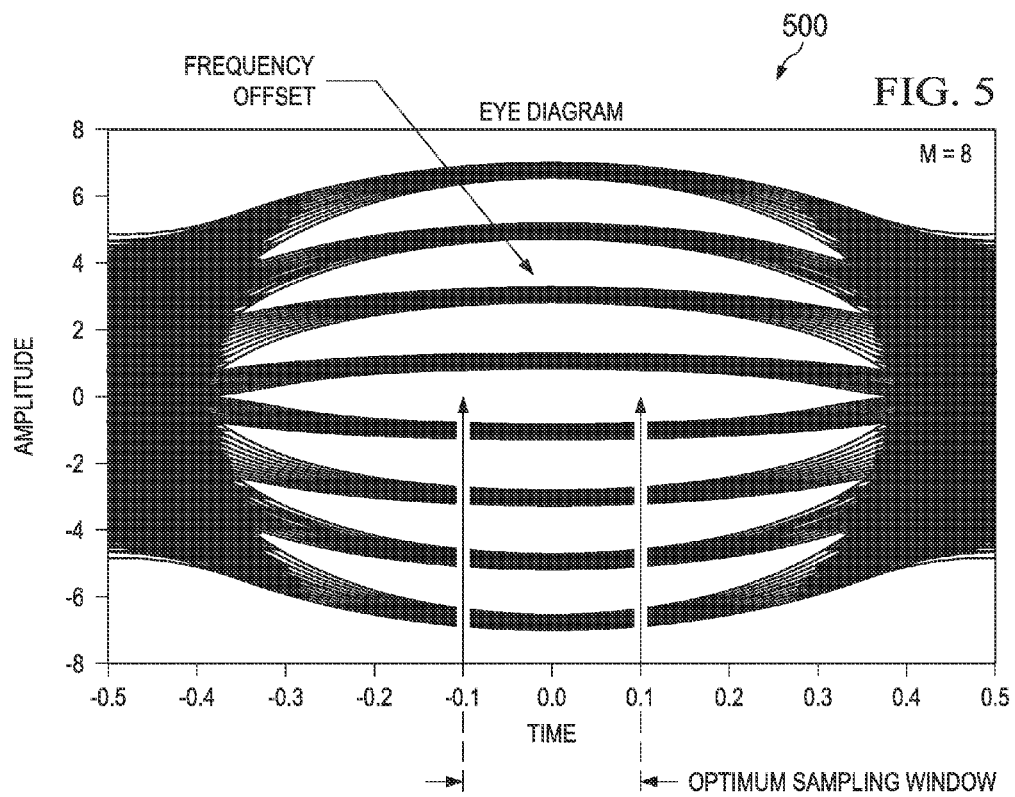
FIG. 5 is a signal diagram of an example embodiment of a superposition in time of the eight valid symbol levels for an 8-ary FSK modulation format.

The 2.4 GHz band is densely populated by multitude of standards. The ability to stream medium-data rates (5 Mbps) requires narrow and agile channels. FIG. 4 provides signal diagram 400 of the spectrum characteristics of a two level modulation format (2-ary FSK) 420 versus a eight level modulation format (8-ary FSK) 410, showing the increased bandwidth efficiency of the 8-ary FSK format. 2-ary FSK 420 provides 11 Mbps of bandwidth in 15 MHz and 8-ary FSK 410 provides 5 Mbps in only 3.8 MHz. FIG. 5 provides signal diagram 500 of a superposition in time of the eight valid symbol levels for an 8-ary FSK modulation format, in the time duration of a single symbol, so called "eye diagram representation."

In this respect, Multilevel Frequency Modulations (M-ary CPFSK) are desirable because of their high spectral efficiency (~1.5 bits/s/Hz, M=8). However, M-ary CPFSK uses precise estimation of the receiver's parameters in order to ensure a reliable operation. These parameters include the DC offset (the signal itself may be at a substantially low frequency), the frequency offset between the TX and the RX circuits, synchronization to the sampling window, and the number of levels (M) used in the payload.

Figure 6:
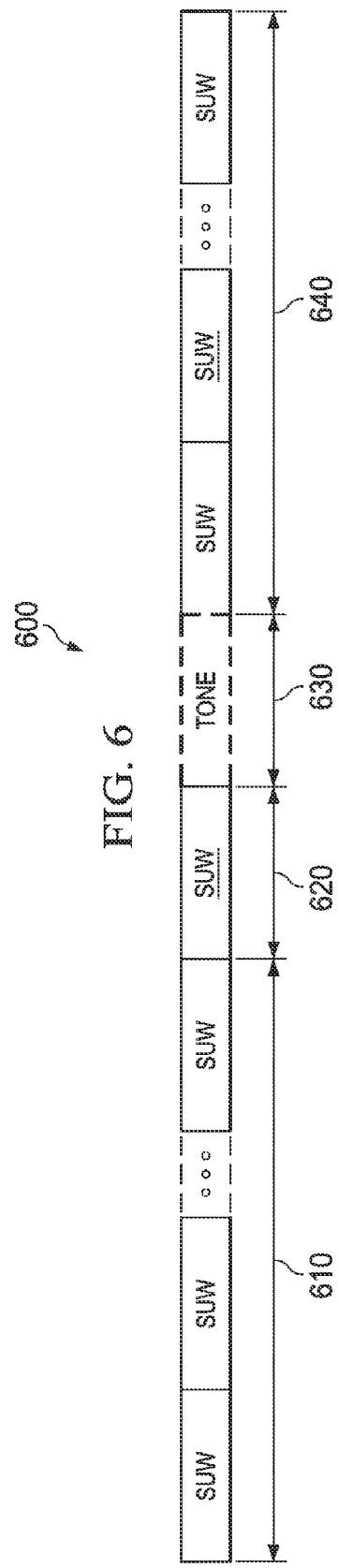
FIG. 6 is a block diagram of an example embodiment of a preamble sequence for multilevel frequency modulations.

Example embodiments of the preamble sequence disclosed herein, as provided in FIG. 6, estimate the receiver parameters listed above (the DC offset, the frequency offset, synchronization, and M). Preamble 600 may be comprised of initial sequence 610, synchronization mark 620, tone signal 630, and additional sequence 640. Initial sequence 610 comprises a repeating a single Synchronization Unique Word (SUW) of length S-symbols multiple times. The SUW may be repeated a number of times. Synchronization mark 620 comprises a repetition of the inverse of the SUW sequence (denoted as SUW). An example embodiment of tone signal 630 (for example, a sinusoidal signal) follows immediately after synchronization mark 620. An example embodiment of additional sequence 640 may be based on a number of repetitions of either the SUW or SUW sequence (and may be called a post-preamble) in a given alternation pattern.

The SUW is a known-sequence of symbols with preferable autocorrelation properties. Since the preamble sequence is meant for M-ary modulations, the symbols used for the SUW are the outer symbols in the symbol alphabet.

$$s(t) = \Re\left\{\exp\left[j2\pi\left(f_c + h\sum_{i=-\infty}^{\infty}\alpha_i q(t-iT_s)\right)\right]\right\}$$

transmitted signal
$\alpha_i \in \{-k \ldots +k\}$ alphabet of M symbols
SUW=[+k−k . . . −k] sequence of S outer symbols
An M-ary CPFSK modulation may be formally represented as:

$$s(t) = m_I(t)\cos(2\pi f_c t) - m_c(t)\sin(2\pi f_c t)$$

where $f_c$ is the carrier frequency and $m_I(t)$ and $m_q(t)$ constitute the in-phase and quadrature information carrying signals. Further:

$$m_I(t) = \cos(m(t))$$

$$m_Q(t) = \sin(m(t))$$

$$m(t) = 2\pi h \sum_{i=-\infty}^{\infty}\alpha_i q(t-iT_s)$$

where m(t) is the FSK message signal, h is the modulation index, $T_s$ the symbol period, and q(t) is a function of the form:

$$q(t) = \begin{cases} 0 & t < 0 \\ t/2 & 0 \leq t < 1 \\ 1/2 & t \geq 1 \end{cases}$$

that is, a linear function between time 0 and 1.

Whereas q(t) represents the normalized frequency change over a symbol period ($T_s$), it is multiplied by the current symbols $\alpha_i$ which belong to the M-ary alphabet of:

$$\alpha_i \in \{2^*([0 \ldots M-1]) - (M-1)\}$$

For example, in the case of M=8

$$\alpha_i \in \{-7, -5, -3, -1, +1, +3, +5, +7\}$$

The normalized frequency change q(t) can then change its linear ramp with M different "velocities" as given by the value of the current symbol. This is superimposed over the carrier signal as M possible combination of frequency deviations compared to the carrier frequency. Further, the proposed SUW for an M-ary CPSK modulation format is a succession of symbols $\alpha_i$ with the additional restriction that these belong only to the two outer symbols of the legal alphabet {−(M−1),+(M−1)}

As previously described, a preamble sequence according to the disclosed systems and methods of setting a preamble sequence for multilevel frequency modulations is comprised of four sections:

A) synchronization sequence 610, based on a repeatable unique word;

B) start of frame delimiter 620, which consists of the negation of the unique word;
C) continuous wave signal 630 with a certain duration and frequency added after the start of frame delimiter; and
D) additional sequence 640 for further training of the receiver, also based on repetitions of the unique word and/or its negations.

The start of each packet is marked by a known sequence of SUWs and the inverse, $\overline{SUW}$. In example embodiments, the SUW may be defined as the following binary sequence, modulated using the outer symbols in the current constellation (i.e. +/−7 in 8-ary CPFSK):

$$SUW = [+-+---+-++--+++-]$$
$$\overline{SUW} = [-+-+++-+--++---+]$$

This example sequence has good autocorrelation properties and will be detected with a especially tailored correlator. In an example embodiment, the modulator will send a number of SUWs (defined as a parameter) before sending the first $\overline{SUW}$ mark. This identifies the start of the packet and will be used as a "coarse synchronization" indication.

When the preamble (including initial sequence 610 and synch mark 620) is completed, the modulator will send the post-preamble. The post-preamble is divided into two parts: an initial tone 630 for DC estimation followed by additional sequence 640, for example, 4 SUW or $\overline{SUW}$ sequences. This know sequence is used at the demodulator to adjust several important parameters: modulation type of the received packet, DC offset in the I/Q signals, frequency offset due to the imperfect clock matching between the transmitter and receiver chips, and fine-tuning of the symbol timing at the receiver. The modulator preferably encodes the transmission mode in the post-preamble sequence. The demodulator can chose to ignore this information and receive a given packet in a specified mode, or automatically detect and use the mode set in the modulator.

The following table shows example encoding of additional sequence 640 under the different transmission modes:

| Mode | Additional Sequence | | | |
|---|---|---|---|---|
| 5 Mbps | SUW | SUW | SUW | SUW |
| 2 Mbps | SUW | SUW | SUW | $\overline{SUW}$ |
| 1 Mbps | SUW | SUW | $\overline{SUW}$ | SUW |
| 500 Kbps | SUW | SUW | $\overline{SUW}$ | $\overline{SUW}$ |
| 250 kbps | SUW | $\overline{SUW}$ | SUW | SUW |

Example embodiments of the disclosed systems and methods of setting a preamble sequence for multilevel frequency modulations extend the previous preambles with elements A 610 and B 620 to include elements C 630 and D 640. The addition of elements C 630 and D 640 enables a simpler receiver in terms of complexity while increasing performance. A lower signal level is required to guarantee a number of bit errors. Adding the continuous wave signal and the additional training sequence leads to several advantages. A receiver that operates with such a preamble structure is able to function in Zero-IF mode. In Zero-IF mode, the mixing frequency of the receiver's local oscillator is as close as possible to the transmitter's carrier frequency. Zero-IF receivers have advantages in terms of power consumption and circuit area, but have the disadvantage of having to deal with the DC offset component that appears within the signal spectrum. The disclosed preamble structure has sufficient information in element the continuous wave signal to allow the receiver to estimate the DC offset with, for example, less than 2% error.

The disclosed preamble also has shorter transmission duration. The complete preamble can be as short as 64 us (802.11 has a standard preamble duration of 144 us). Even the so-called short preamble mode of 802.11b lasts 96 us. Shorter preamble formats do exist (for instance Bluetooth Low Energy uses 48 us), but these short preambles are not suited for multilevel modulations.

Example embodiments of the preamble are based on a single SUW element. That element can be detected with lower signal-to-noise ratios than normal payload bits when using matched correlation logic. A single hardware correlator can provide both positive and negative correlation peaks when the signal is detected. Frequency offset information and fine timing information can be extracted from element D 640 with high precision (for example, <8% estimation error for 32 us of post-preamble), as the receiver has already found a coarse timing element in element B 620, which allows for integration of the signal over a known period. This approach provides a more precise estimation than traditional (blind) integration schemes when frequency offset has to be found prior to the arrival of element B 620. The increased precision of the estimation enables the correct placement of the multi-level symbol frequencies and increases the overall robustness of the receiver.

Example embodiments of the disclosed preamble sequence comprising elements A 610, B 620, C 630, and D 640 have many advantages. For instance, by defining elements A 610, B 620, and D 640 as repetitions of a basic SUW, the receiver can implement a single correlation block to maximize the detection against noise and interferers. Inserting element C 630 after the elements A 610 and B 620 gives the receiver a precise timing window in which to analyze the tone, resulting in simpler logic circuitry (for example, an accumulator is sufficient) and achieve very good accuracy in the estimation of any DC offset (for example, <2% error, tone duration of 8 us). Since the DC offset can be calibrated away due to element C 630, the disclosed preamble sequence enables a Zero-IF receiver architecture, which in turn uses less area and power than Low-IF receivers.

In a similar fashion, the receiver has a precise timing window to analyze element D 640 and determine both the frequency offset and the initial estimation of the optimal sampling instant. Being able to accurately estimate the frequency offset (for example, <8% estimation error for 32 us of post-preamble) enables the use of M-ary frequency modulations (M=4, 8, 16) without becoming the limiting factor for the receiver's sensitivity. The alternation pattern of element D 640 can be used to signal out-of-band information to the receiver, for instance, the number of symbol levels of the payload. Packet detection is improved if any given wireless protocol uses the defined sequence by simply demodulating the transmitted signal with any frequency demodulator.

Although the present disclosure has been described in detail, it should be understood that various changes, substitutions and alterations can be made thereto without departing from the spirit and scope of the disclosure as defined by the appended claims.

Therefore, at least the following is claimed:
1. A physical layer device comprising:
   an encoder configured to format a preamble of a data packet, the preamble having:
   i. an initial sequence having plural instances of a synchronization unique word (SUW), the SUW being formed of symbols from a symbol alphabet, and further being formed of the outer symbols of the symbol alphabet;
ii. a synchronization mark that follows the initial sequence and that is an inverse of one SUW;
iii. a tone signal following the synchronization mark; and
iv. an additional sequence following the tone signal and having at least one instance of the SUW and at least one instance of the inverse of the SUW.

2. The physical layer device of claim 1 in which the additional sequence includes plural instances of the SUW and at least one instance of the inverse of the SUW to code for transmission modes.

3. The physical layer device of claim 1 in which the tone signal is a sinusoidal signal.

4. The physical layer device of claim 1 in which the additional sequence includes at least one instance of the SUW and plural instances of the inverse of the SUW to code for transmission modes.

* * * * *